(12) United States Patent
Abe et al.

(10) Patent No.: US 8,434,808 B2
(45) Date of Patent: May 7, 2013

(54) VEHICLE SEAT

(75) Inventors: Hirohisa Abe, Shioya-gun (JP);
Toshiyuki Tsujibayashi, Shioya-gun (JP); Toshihiko Tsuda, Wako (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 192 days.

(21) Appl. No.: 12/678,234

(22) PCT Filed: Sep. 13, 2008

(86) PCT No.: PCT/JP2008/066611
§ 371 (c)(1),
(2), (4) Date: Feb. 28, 2011

(87) PCT Pub. No.: WO2009/035118
PCT Pub. Date: Mar. 19, 2009

(65) Prior Publication Data
US 2011/0204670 A1    Aug. 25, 2011

(30) Foreign Application Priority Data
Sep. 14, 2007   (JP) ................................. 2007-239788

(51) Int. Cl.
*B60N 2/02*     (2006.01)
(52) U.S. Cl.
USPC ....... 296/65.03; 296/65.05; 297/15; 297/325; 297/331
(58) Field of Classification Search ............... 296/65.03, 296/65.05, 65.06, 65.09; 297/15, 325, 331, 297/334, 344.14, 344.15, 344.17
See application file for complete search history.

(56) References Cited

U.S. PATENT DOCUMENTS

| | | | | |
|---|---|---|---|---|
| 4,932,706 A | * | 6/1990 | Wainwright et al. | 296/65.09 |
| 5,195,795 A | * | 3/1993 | Cannera et al. | 296/65.09 |
| 5,482,349 A | * | 1/1996 | Richter et al. | 297/15 |
| 6,582,003 B2 | * | 6/2003 | Fourrey et al. | 296/64 |
| 7,066,539 B2 | * | 6/2006 | Hatta et al. | 297/344.14 |
| 2006/0138836 A1 | * | 6/2006 | Yudovich | 297/335 |

FOREIGN PATENT DOCUMENTS

| | | |
|---|---|---|
| GB | 2 251 183 A | 7/1992 |
| JP | 2002362202 A | 12/2002 |
| JP | 2005212554 A | 8/2005 |
| JP | 2007182153 A | 7/2007 |

OTHER PUBLICATIONS

Office Action established for CN 200880116269.9 (Mar. 12, 2012).

* cited by examiner

*Primary Examiner* — Lori Lyjak
(74) *Attorney, Agent, or Firm* — Drinker Biddle & Reath LLP

(57) ABSTRACT

A vehicle seat has a seatback movable between an upright position and a horizontal position, a seat bottom movable between a use position perpendicular to the seatback and a stowage position parallel to the seatback, and a lock mechanism for holding the seat bottom at the stowage position when the seat bottom is moved to the stowage position. When the seatback is moved to the horizontal position, the vehicle seat has a dive-down state where the seatback and the seat bottom are stacked on top of the other. The seat bottom has a detection lever that, when the seat bottom becomes the dive-down state, comes into contact with a floor panel and is displaced. In the lock mechanism, when the detection lever is displaced, the function of holding the seat bottom at the stowage position becomes ineffective.

30 Claims, 7 Drawing Sheets

VEHICLE SEAT

TECHNICAL FIELD

The present invention relates to a vehicle seat and in particular, to a vehicle seat storable in a recess portion formed on a floor panel.

BACKGROUND ART

Conventionally, there has been proposed a vehicle seat that can transform states (postures) thereof as shown in FIGS. 12 to 14. The vehicle seat is provided with a seatback A pivotally attached to a floor panel B of a vehicle body, a seat bottom C pivotally attached to the seatback A, and a leg portion D pivotally attached to the seat bottom C.

The vehicle seat is transformed into any of three states: an ordinary state (FIG. 12), a tip-up state where the seat is totally upright (FIG. 13) and a dive-down state where the seat is stored in a recess portion E on the floor panel B (FIG. 14). Under the tip-up state or the dive-down state, the seatback A, the seat bottom C and the leg portion D are stacked in parallel to each other.

The vehicle seat has a lock mechanism that locks the seat bottom C to the seatback A when the seat bottom C is moved to a storage position in parallel to the seatback A. Accordingly, in order to return the seat bottom C to a horizontal use position under a state shown in FIG. 13, the lock mechanism needs to be unlocked. The lock mechanism operates even under a state shown in FIG. 14. Accordingly, to return a state shown in FIG. 14 to a state shown in FIG. 12, the lock mechanism needs to return to an unlock state.

A problem of the lock mechanism being placed into a lock state under a dive-down state has been solved by a vehicle seat proposed in JP2005-212554A. The vehicle seat is provided with a release function that makes the lock mechanism inoperable when the vehicle seat is placed into a dive-down state. Patent Document 1: JP 2005-212554A1.

DISCLOSURE OF THE INVENTION

The vehicle seat has a problem of the complexity of a release mechanism which detects that the vehicle seat has been transformed into a dive-down state. Because of the complexity of the release function, function setting becomes difficult, thus making assembly of the release function difficult.

In view of the foregoing problems, it is an object of the present invention to provide a vehicle seat equipped with an improved release mechanism (detection lever) that can make a lock mechanism inoperable by detecting a dive-down state. The improved release mechanism, having a simple configuration, enables easy setting and assembly.

BEST MODE FOR CARRYING OUT THE INVENTION

Figure 1:
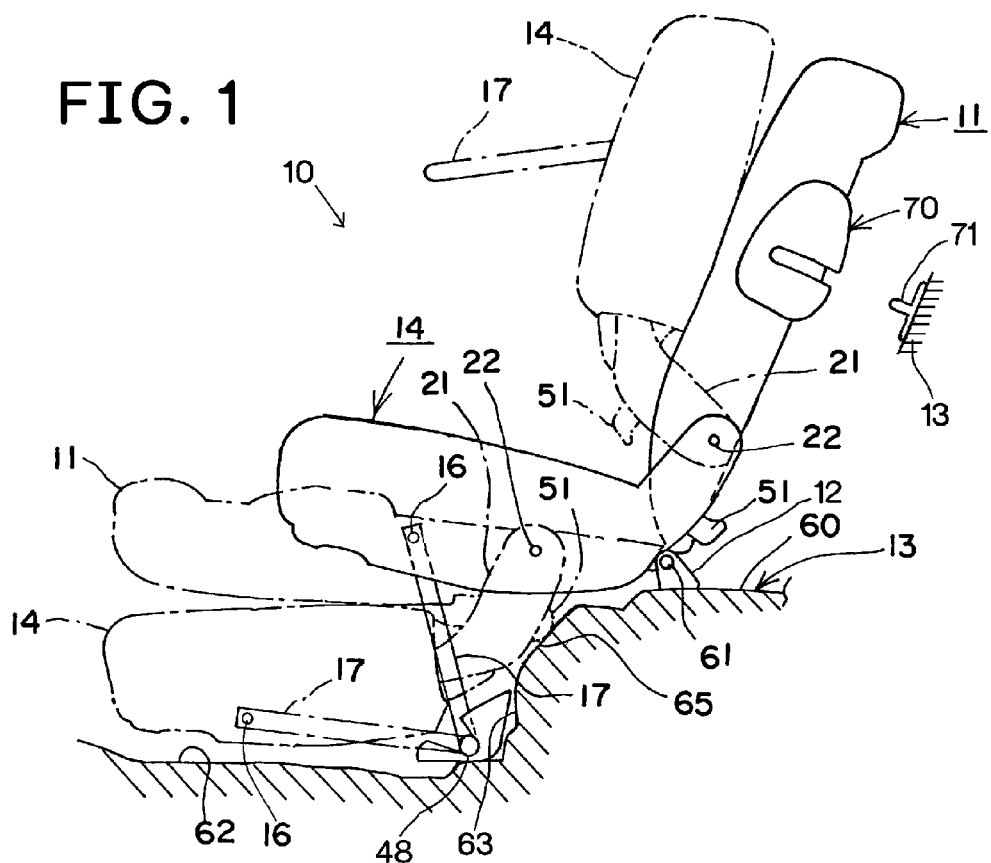
FIG. 1 is a schematic side view of a vehicle seat according to the present invention.
Figure 2:
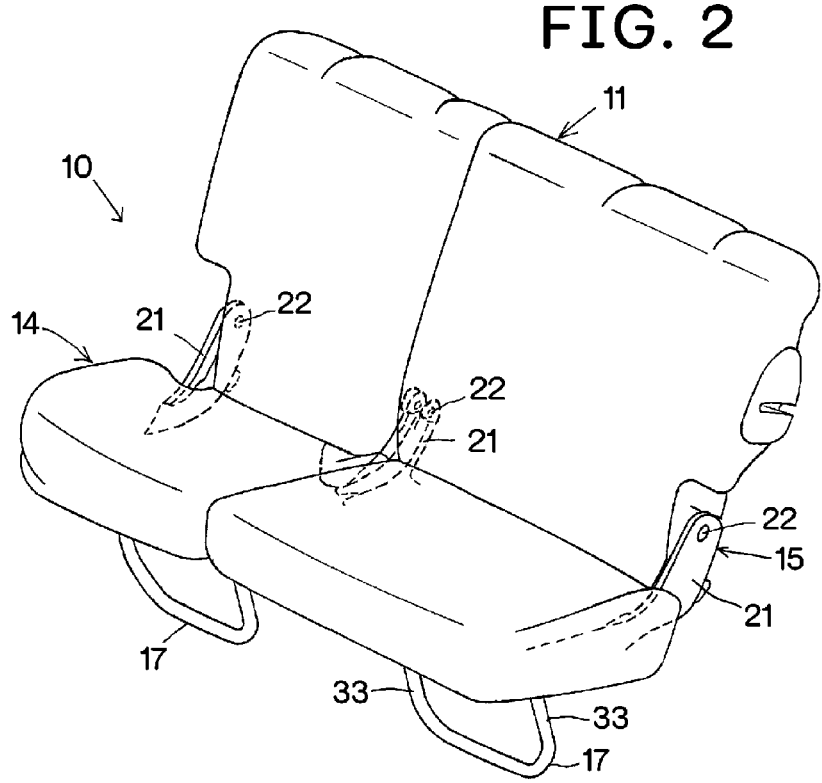
FIG. 2 is a schematic perspective view of the vehicle seat according to the present invention.

An embodiment of the present invention will be described below with reference to the accompanying drawings. A vehicle seat 10 according to the present invention is provided with a seatback 11, a seat bottom 14 and a leg portion 17. The seatback 11 is attached to a supporting member 12 fixed on a vehicle body 13 so as to be pivotable about a seat shaft 61. The seat bottom 14 is attached to the seatback 11 so as to be pivotable about a coupling shaft 22. The leg portion 17 is attached to the seat bottom 14 so as to be pivotable about a leg shaft 16.

The seatback 11 is configured to be displaceable, around the seat shaft 61, between a substantially perpendicularly upright position shown by solid lines in FIG. 1 and a substantially horizontal position shown by dotted lines in FIG. 1. The seat bottom 14 is configured to be displaceable, around the coupling shaft 22, between a use position substantially orthogonal to the seatback 11 and a storage position substantially parallel to the seatback 11. The leg portion 17 is configured to be displaceable, around the leg shaft 16, between a support position substantially orthogonal to the seat bottom 14 and a storage position substantially parallel to the seat bottom 14.

The vehicle seat 10, having a plurality of members movable in the above-described way, is transformed into any of the following three states: an ordinary state, a tip-up state and a dive-down state. The vehicle seat 10 under an ordinary state has the seatback 11 under an upright state, the seat bottom 14 in a use position orthogonal to the seatback 11 and the leg portion 17 in a support position orthogonal to the seat bottom 14.

The vehicle seat 10 under a tip-up state has the seatback 11 under an upright state, the seat bottom 14 in a storage position parallel to the seatback 11 and the leg portion 17 in a storage position parallel to the seat bottom 14. The vehicle seat 10 under a tip-up state can form a wide space in front of the vehicle seat 10.

The vehicle seat 10 under a dive-down state has the seatback 11 under a horizontal state, the seat bottom 14 in a storage position parallel to the seatback 11 and the leg portion 17 in a storage position parallel to the seat bottom 14. The vehicle seat 10 under a dive-down state is substantially stored in a recess portion or a lower-level floor portion 62 formed on a floor panel 60 of the vehicle body 13, as shown in FIG. 1. Thus, the substantially flat and wide floor panel 60 is attained.

The seatback 11 has a latch device 70 engageable with a striker 71 fixed on the vehicle body 13. The engagement of the striker 71 with the latch device 70 retains the seatback 11 in an upright position. Disengagement of the striker 71 from the latch device 70 allows the seatback 11 to be displaced from an upright position to a horizontal position. The latch device 70 and the striker 71 both have a well-known structure.

FIGS. 3 to 6 show coupling means 15 for coupling the seatback 11 to the seat bottom 14. The coupling means 15 has a seatback bracket 19 and a seat bottom bracket 21. The seatback bracket 19 is fixed onto a seatback frame 56 (refer to FIG. 7) of the seatback 11 and the seat bottom bracket 21 is fixed onto a seat bottom frame 20 of the seat bottom 14. The bracket 19 and the bracket 21 are coupled to each other so as to be pivotable around the coupling shaft 22. The seat bottom bracket 21 (seat bottom 14) swings between a use position (a position orthogonal to the bracket 19) shown in FIG. 3 and a storage position (a position parallel to the bracket 19) shown in FIGS. 4 to 6.

The coupling means 15 has a lock mechanism 18 capable of retaining the seat bottom 14 in the storage position. The lock mechanism 18 has a notched portion 24 formed in the seatback bracket 19 and an engagement lever 26 engageable with the notched portion 24. The engagement lever 26 is attached to the seat bottom bracket 21 through a shaft 27 and biased clockwise in FIGS. 3 to 6 through a spring (not shown).

Figure 3:
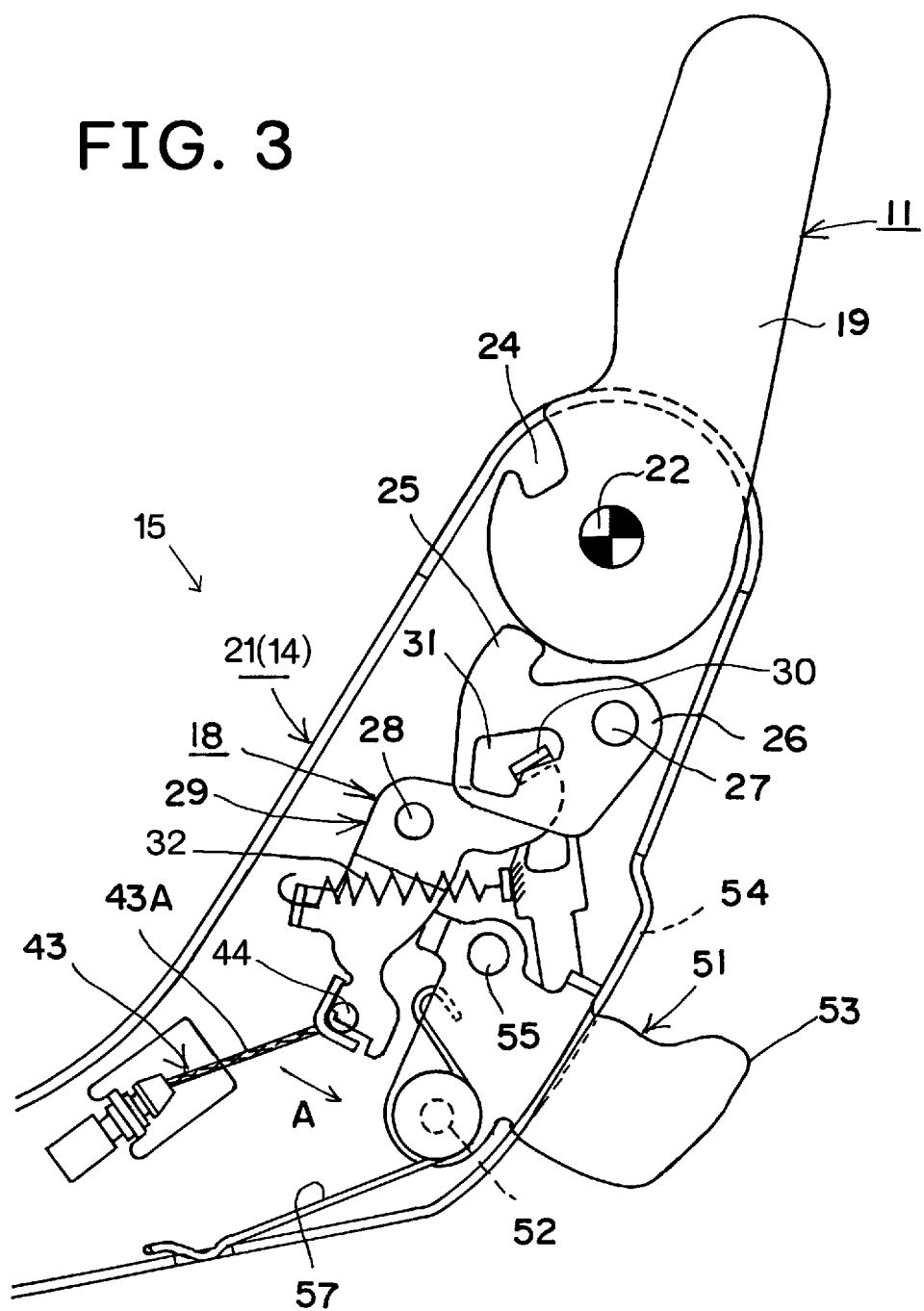
FIG. 3 is a side view of coupling means when the vehicle seat is under an ordinary state.
Figure 4:
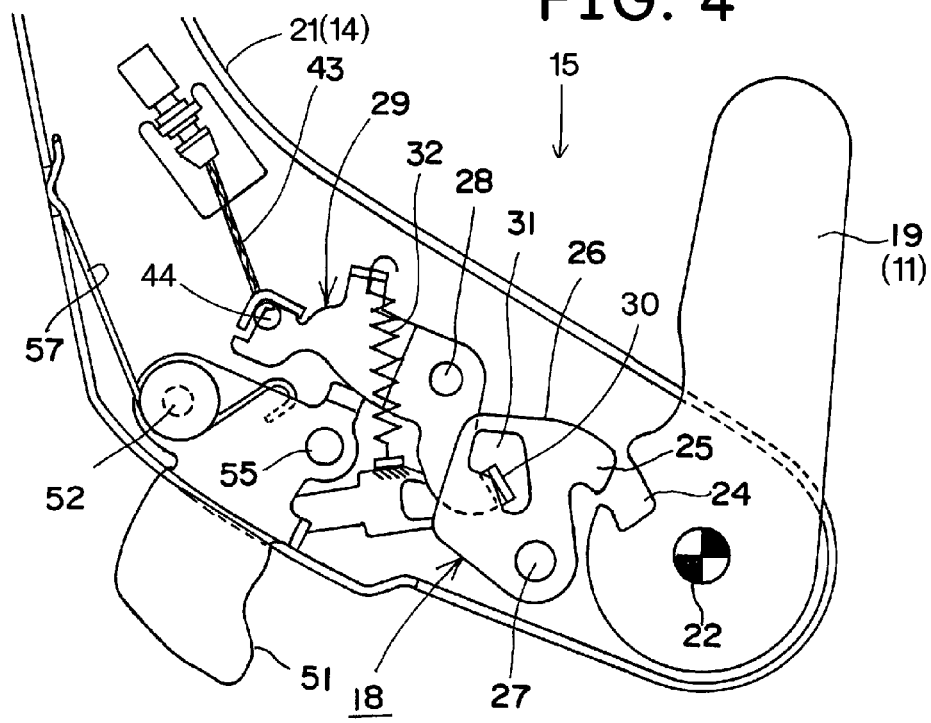
FIG. 4 is a side view of the coupling means when the vehicle seat is under a tip-up state.
Figure 5:
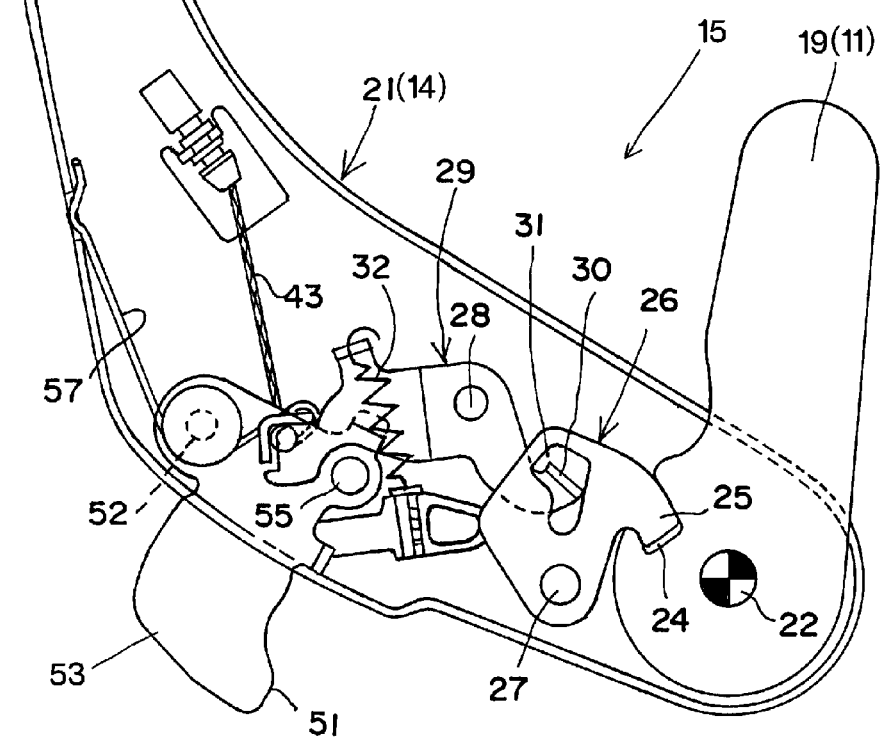
FIG. 5 is a side view of the coupling means when a lock mechanism is placed into a lock state under a state in FIG. 4.

The seatback 11 shown in FIGS. 3 to 5 is in an upright position. When the seat bottom 14 is pivoted from a use position in FIG. 3 to a storage position in FIG. 4, the seat bottom 14 is kept in substantially parallel to the seatback 11 and a claw 25 of the engagement lever 26 moves to an entrance of the notched portion 24. Under this state, when the engagement lever 26 is pivoted by the elastic force of a spring, the claw 25 of the engagement lever 26 engages with the notched portion 24 as shown in FIG. 5, so that the lock mechanism 18 is placed into a lock state. Under the lock state, the seat bottom 14 (seat bottom bracket 21) is coupled to the seatback 11 (seatback bracket 19) so as to be nonpivotable and the seat bottom 14 is retained in a storage position.

The lock mechanism 18 further includes a lock lever 29 attached to the seat bottom bracket 21 with a shaft 28. When the lock lever 29 is moved clockwise, the lock lever 29 is placed into an unlock position shown in FIGS. 3, 4, 6. On the other hand, when moved counterclockwise, the lock lever 29 is placed into a lock position shown in FIG. 5. The lock lever 29 has a bent portion 30 disposed in a window hole 31 formed in the engagement lever 26. When the lock lever 29 is in an unlock position, clockwise rotation of the engagement lever 26 is regulated by abutment of the bent portion 30 against the window hole 31, so that the engagement lever 26 cannot engage with the notched portion 24. However, when the lock lever 29 is displaced to a lock position, abutment of the bent portion 30 against the window hole 31 is released and, as shown in FIG. 5, the engagement lever 26 can engage with the notched portion 24.

The lock lever 29 is biased toward a lock position from an unlock position by the elastic force of a spring 32. In other words, the lock lever 29 is biased in an arrow A direction (counterclockwise) around the shaft 28.

The lock lever 29 is coupled to the leg portion 17 through coupling means 43 (preferably wire cable or rod). When the leg portion 17 is displaced from a storage position to a support position, the lock lever 29 is displaced from a lock position to an unlock position against the elastic force of the spring 32. An important point herein is that when the lock lever 29 is pivoted clockwise to an unlock position, the engagement lever 26 is pivoted counterclockwise by abutment of the bent portion 30 against the window hole 31 and the claw 25 disengages from the notched portion 24, as shown in FIG. 5. Thus, a displacement of the leg portion 17 from a storage position to a support position allows the lock mechanism 18 to be returned from a lock state to an unlock state.

Figure 8:
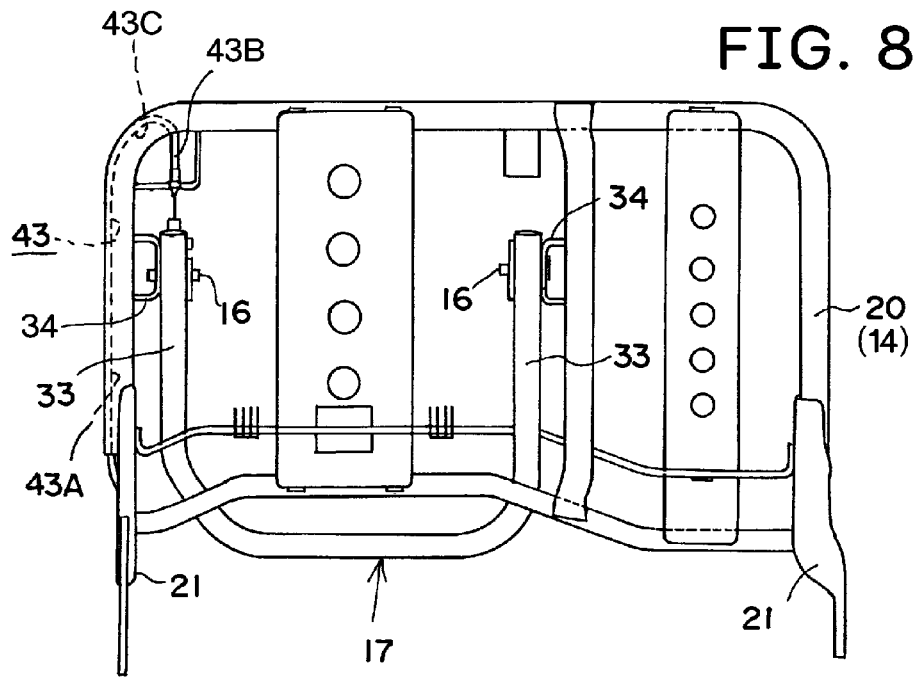
FIG. 8 is a plan view of a seat bottom frame of the vehicle seat.

Preferably, the leg portion 17 is formed of a U-shaped metal member, as shown in FIG. 8. The leg portion 17 has a pair of side legs 33, each of which is pivotably attached to the seat bottom frame 20 through the leg shaft 16. The leg shaft 16 is inserted into an attachment hole 40 formed in the side leg 33 and a hole 42 formed in a bracket 34 fixed to the seat bottom frame 20.

An attachment 36 is inserted into one end of the side leg 33. The attachment 36 has a shaft hole 41 for inserting the leg shaft 16 therein.

The lock lever 29 of the lock mechanism 18 and the leg portion 17 are operatively connected to each other through the wire cable 43. The wire cable 43 has a first portion 43A extending toward the front side of the seat bottom 14 from the lock mechanism 18, a second portion 43B extending toward the front side of the seat bottom 14 from the leg portion 17 and a U-turn portion 43C coupling the front side of the first portion 43A to that of the second portion 43B. The U-turn portion 43C is inevitably positioned forward of the leg portion 17. A cable head 44 of the first portion 43A is coupled to the lock lever 29 and a cable head 45 of the second portion 43B is coupled to a hook 38 of the attachment 36.

Figure 9:
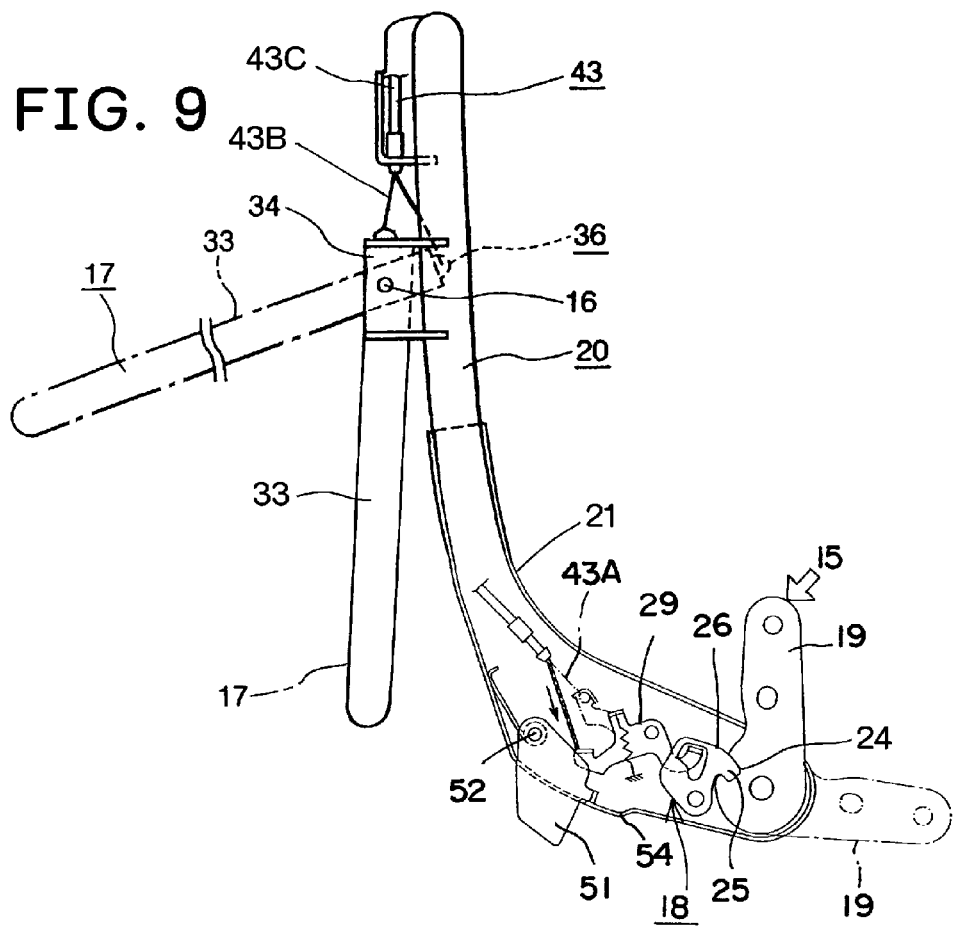
FIG. 9 is a side view of positions of respective frames and leg portions under the tip-up state.
Figure 10:
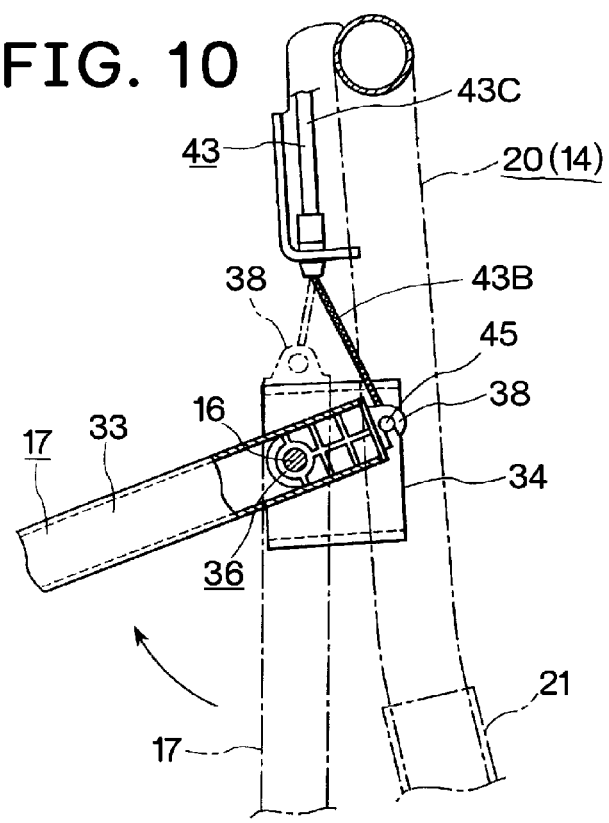
FIG. 10 is an enlarged view of a portion connecting the seat bottom frame with the leg portion.
Figure 11:
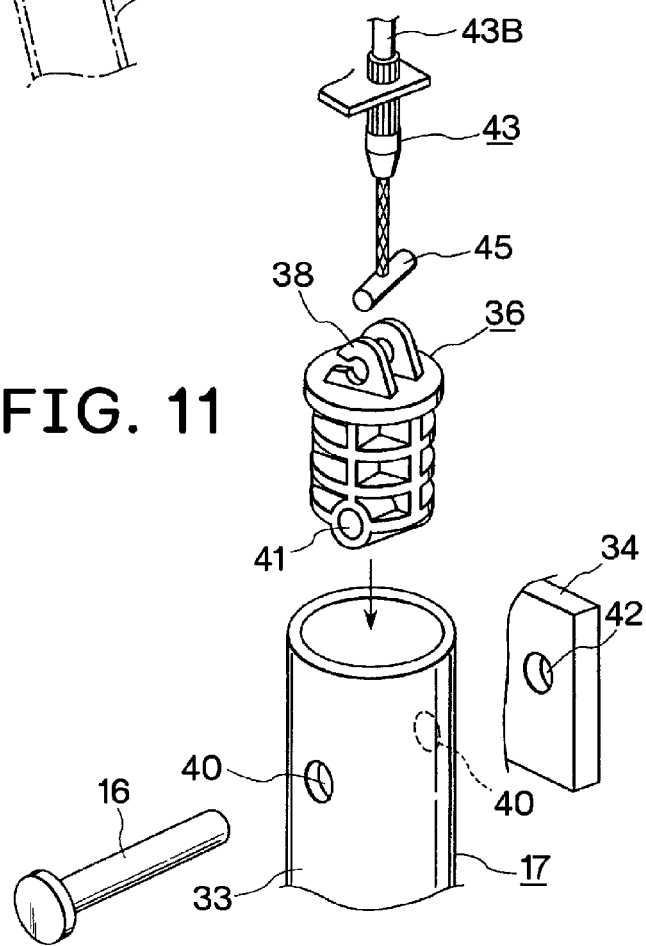
FIG. 11 is an exploded perspective view of the leg portion and a perspective view of fixedly attaching means for connecting a wire cable with the leg portion.
Figure 12:
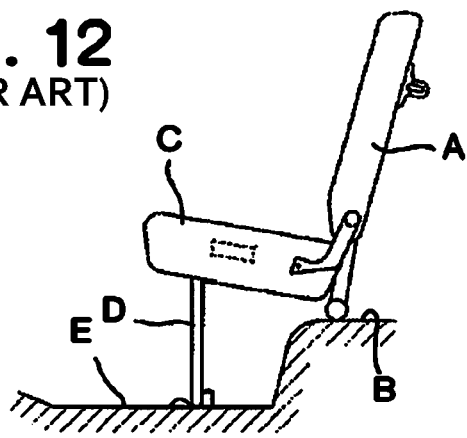
FIG. 12 is an explanatory view of a conventional vehicle seat under an ordinary state.
Figure 13:
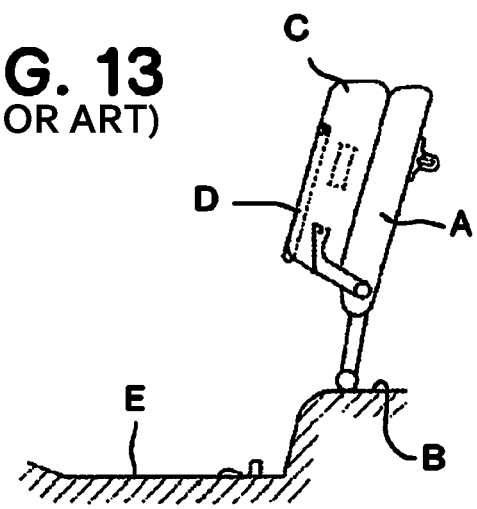
FIG. 13 is an explanatory view of the conventional vehicle seat under a tip-up state.
Figure 14:
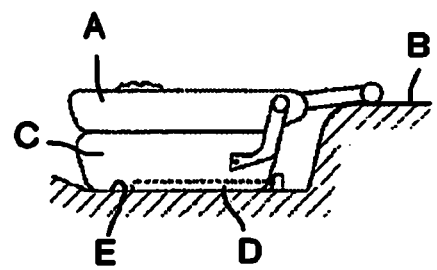
FIG. 14 is an explanatory view of the conventional vehicle seat under a dive-down state.

When the leg portion 17 moves from a storage position (shown by solid lines in FIG. 9) to a support position (shown by dotted lines in FIG. 9), the second portion 43B moves downward in FIG. 9, the first portion 43A moves upward, the lock lever 29 pivots clockwise and moves to an unlock position. Thus, the claw 25 of the engagement lever 26 is disengaged from the notched portion 24 in the seatback 11, so that the seat bottom 14 is placed into a displaceable state from a storage position to a use position.

On the lower-level floor portion 62, there is provided a receiving groove 48 to retain a tip end of the leg portion 17. The receiving groove 48 is formed into a U shape having a wide entrance. When the seat 10 is under an ordinary state, the leg portion 17 engages with the receiving groove 48, thus robustly supporting the seat bottom 14. To pivot the seat bottom 14 from the use position to the storage position, the seat bottom 14 is lifted up, thereby easily disengaging the leg portion 17 from the receiving groove 48 without special operation.

The normal floor panel 60 and the lower-level floor portion 62 are coupled to each other through a connection panel 63.

The seat bottom 14 is provided with a detection lever 51 for detecting movement from an ordinary state (or tip-up state) to a dive-down state of the seat bottom 14. Preferably, the detection lever 51 is attached to the seat bottom bracket 21 so as to be pivotable about a shaft 52. The detection lever 51 is biased clockwise by the elastic force of a detection spring 57 as shown in FIG. 3 and a front end portion 53 of the detection lever 51 is usually projecting outward of an outer edge 54 of the bracket 21.

The detection lever 51 has a pin 55 abutable on the lock lever 29. When the detection lever 51 is pressed into an interior side of the bracket 21 against the elastic force of the detection spring 57, the pin 55 abuts on the lock lever 29, so that the lock lever 29 is moved from a lock position to an unlock position.

Under an ordinary state, when the seatback 11 is pivoted forward about the seat shaft 61, the seat bottom 14 coupled to the seatback 11 through the coupling shaft 22 moves downward while moving forward, and the leg portion 17 tilts toward a storage position from a support position to transform the seat 10 into a dive-down state. At this time, the connection panel 63 has no interference with movement of the seat 10. However, the connection panel 63 has an abutment surface 65 that abuts on the detection lever 51 and presses the detection lever 51 into an interior side of the bracket 21 against the elastic force of the detection spring 57, while the seat 10 is being transformed from an ordinary state to a dive-down state.

Preferably, the abutment surface 65 is such an inclined surface that a front side thereof is directed downward. Preferably, the abutment surface 65 has no mechanical interference with movement of the seat 10, but efficiently abuts on the detection lever 51 to effectively move the detection lever 51. Further, preferably, a distance between the detection lever 51 and the abutment surface 65 is set to be the shortest under a dive-down state. This setting can be easily achieved because the abutment surface 65 is disposed on the connection panel 63 between the normal floor panel 60 and the lower-level floor portion 62.

When the seat 10 is kept under a dive-down state, the detection lever 51 is pivoted against the elastic force of the spring 57 by abutment on the abutment surface 65, so that the lock lever 29 is switched to an unlock position. Accordingly, under a dive-down state, the seat bottom 14 is not fixed to the seatback 11.

In the present embodiment, the lock lever 29 is configured to be displaced to an unlock position by pivoting the detection lever 51. However, the engagement lever 26 may be configured to be displaced by pivoting the detection lever 51.

[Tip-Up State]

When the seat 10 is under an ordinary state, the coupling means 15 is under a state shown in FIG. 3 and the lock mechanism 18 is unlocked. When the seat bottom 14 is pivoted clockwise around the coupling shaft 22 to be moved to a storage position, a state shown in FIG. 4 is kept and the claw 25 of the engagement lever 26 of the lock mechanism 18 moves to an entrance of the notched portion 24.

Next, when the leg portion 17 is pivoted from a support position to a storage position, the cable head 44 of the wire cable 43 moves downward and the lock lever 29 is pivoted counterclockwise around the shaft 28 by the elastic force of the spring 32, so that the bent portion 30 moves, as shown in FIG. 4. Thus, as shown in FIG. 5, the engagement lever 26 is pivoted clockwise, the claw 25 engages with the notched portion 24, the lock mechanism 18 is placed into a lock state, the seat bottom 14 is retained in a storage position, and the seat 10 is transformed into a tip-up state.

Under a tip-up state shown in FIG. 5, when the leg portion 17 is pivoted from a storage position to a support position, the cable head 44 of the wire cable 43 moves upward and the lock lever 29 is pivoted clockwise against the elastic force of the spring 32. As a result, the engagement lever 26 as well is pivoted, and the claw 25 of the engagement lever 26 disengages from the notched portion 24 in the seatback bracket 19 and the lock mechanism 18 is placed in an unlock state.

Accordingly, when the seat bottom 14 is pivoted toward a use position around the coupling shaft 22, the seat 10 returns to an ordinary state shown in FIG. 3.

As described above, the lock mechanism 18 is returned to an unlock state as the leg portion 17 is pivoted from a storage position to a support position. Hence, the seat bottom 14 cannot be displaced to a use position without movement of the leg portion 17 to a support position. Accordingly, the seat bottom 14 is supported by the leg portion 17 whenever the seat bottom 14 is in a use position. In addition, dedicated operation for placing the lock mechanism 18 into an unlock state is unnecessary.

[Dive-Down State]

Figure 7:
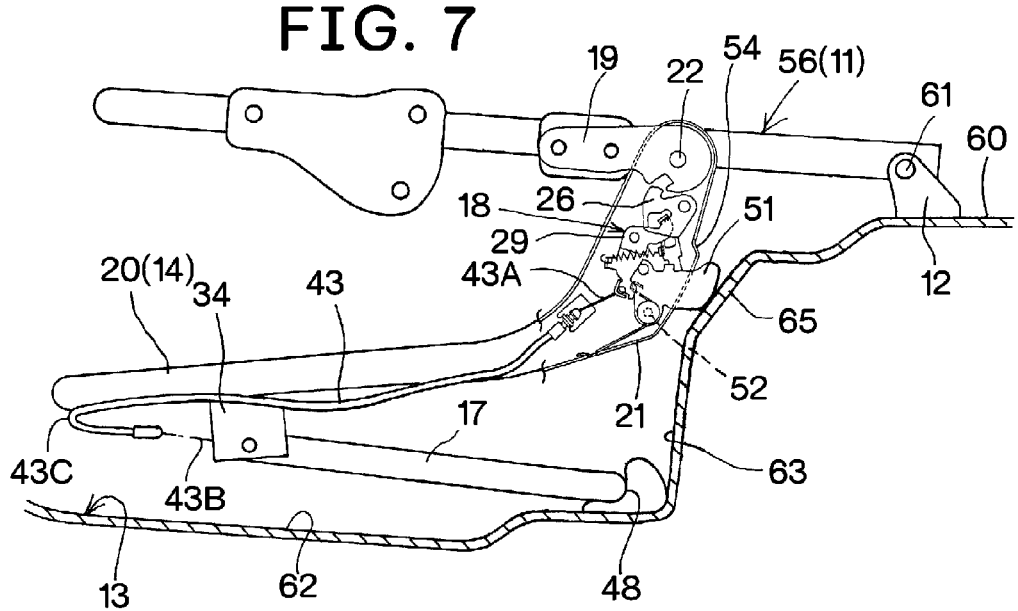
FIG. 7 is a side view of positions of respective frames and leg portions when the vehicle seat is in a dive-down state.

When the latch device 70 is disengaged from the striker 71, the seatback 11 becomes pivotable forward around the seat shaft 61. When the seatback 11 is pivoted, the seat bottom 14 coupled to the seatback 11 through the coupling shaft 22 moves downward while moving forward, and the leg portion 17 gradually tilts. As shown in FIG. 7, the seat 10 is stored in the lower-level floor portion 62 and transformed into a dive-down state. As described above, transformation of the seat 10 into a dive-down state is achieved only by release of the latch device 70 and forward movement of the seatback 11.

Figure 6:
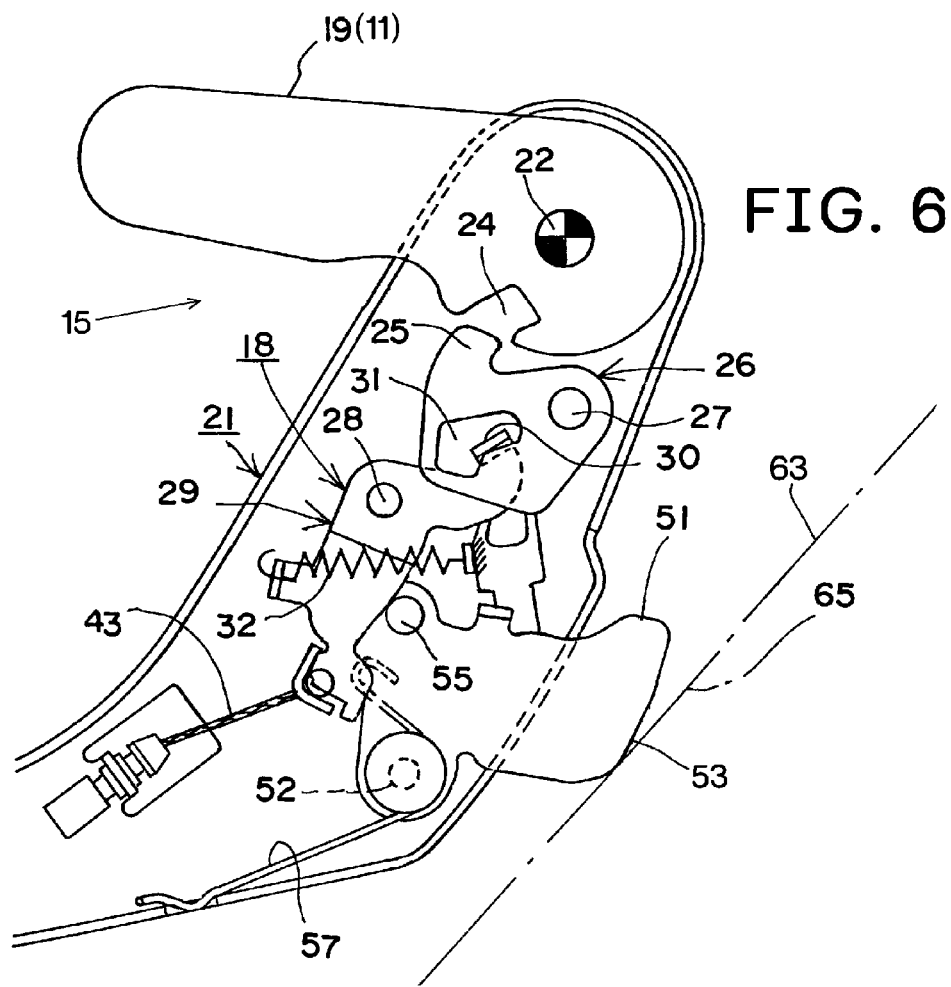
FIG. 6 is a side view of the coupling means when the vehicle seat is in a dive-down state.

In the above-described operation, when the seat bottom 14 moves to a dive-down position, the detection lever 51 of the seat bottom 14 abuts on the abutment surface 65 of the floor panel 60 as shown in FIG. 6, so that the detection lever 51 is pressed into an interior portion of the bracket 21 against the elastic force of the spring 57. Thus, the pin 55 of the detection lever 51 abuts on the lock lever 29 to move the lock lever 29 from a lock position to an unlock position. Accordingly, even when the bottom seat 14 moves to the storage position, the lock mechanism 18 is maintained under an unlock state.

Under a dive-down state, when the seatback 11 is pivoted toward an upright position, the seat bottom 14 moves upward while gradually moving backward, the leg portion 17 gradually returns to the upright state, and the seat 10 returns to an ordinary state. At this time, operation of unlocking the lock mechanism 18 is not necessary, which facilitates transformation from a dive-down state to an ordinary state.

In other words, when the lock mechanism is locked under a dive-down state, the seat bottom as well is placed in an upright state in returning the seatback to an upright position. Thus, it is necessary for the seat to be transformed from a dive-down state to a tip-up state and subsequently to be returned to an ordinary state. In contrast, the present invention enables the seat 10 to be directly transformed from a dive-down state to an ordinary state.

As described above, the detection lever 51 of the present invention abuts on the abutment surface 65 of the floor panel 60 during movement of the seat bottom 14 to a dive-down state to maintain the lock mechanism 18 under an unlock state, thus achieving easy setting.

Because the abutment surface 65 according to the present invention is formed on the connection panel 63, the abutment surface 65 can reliably abut on the detection lever 51 with high efficiency without causing interference with movement of the seat 10.

Further, because the abutment surface 65 of the present invention is formed on the connection panel 63, a distance between the detection lever 51 and the abutment surface 65 can be easily set to be the shortest under a dive-down state.

The invention claimed is:

1. A vehicle seat comprising:
   a seatback pivotably attached to a floor panel and displaceable to an upright position and a horizontal position;
   a seat bottom pivotably attached to the seatback and displaceable to a use position orthogonal to the seatback and a storage position parallel to the seatback; and
   a lock mechanism retaining the seat bottom in the storage position when the seat bottom is displaced to the storage position,
   the vehicle seat being transformable to a dive-down state under which the vehicle seat is stored by moving the seat bottom to a lower position than the use position, the seatback and the seat bottom being stacked on top of the other, when the seatback is moved from the upright position to the horizontal position, wherein the seat bottom is provided with a detection lever which is displaced by abutting on the floor panel while the seat bottom is being placed into a the dive-down state, and the lock mechanism is configured to make inoperable a function for retaining the seat bottom in the storage position when the detection lever is displaced.

2. The vehicle seat according to claim 1, wherein the abutment surface is formed on a connection panel for connecting a lower-level floor portion storing the vehicle seat under a drive-down state with the floor panel.

3. The vehicle seat according to claim 2, wherein the abutment surface is an inclined surface.

4. The vehicle seat according to claim 1, wherein the detection lever has a plate shape.

5. The vehicle seat according to claim 1, wherein the detection lever is formed of a plate member and pivotably supported by a bracket that connects the seat bottom to the seatback.

6. The vehicle seat according to claim 1, wherein at least a part of the detection lever is positioned outside a bracket that connects the seat bottom to the seatback.

7. A vehicle seat comprising:
a seatback displaceable to an upright position and a horizontal position;
a seat bottom pivotably attached to the seatback and displaceable to a use position at a predetermined angle with the seatback and a storage position parallel to the seatback; and
a lock mechanism retaining the seat bottom in the storage position when the seat bottom is displaced to the storage position;
wherein:
the seat bottom is movable to a lower position than the use position when the seatback and the seat bottom are stacked on top of the other after the seatback is displaced from the upright position to the horizontal position;
the vehicle seat further comprises a detection member that is displaceable by abutting on the floor panel when the seat bottom moves; and
the lock mechanism is configured to make inoperable a function for retaining the seat bottom in the storage position when the detection member is displaced.

8. The vehicle seat according to claim 7, wherein the abutment surface is formed on a connection panel for connecting a lower-level floor portion storing the vehicle seat with the floor panel.

9. The vehicle seat according to claim 8, wherein the abutment surface is an inclined surface.

10. The vehicle seat according to claim 7, wherein the detection member has a plate shape.

11. The vehicle seat according to claim 7, wherein the detection member is formed of a plate member and pivotably supported by a bracket that connects the seat bottom to the seatback.

12. The vehicle seat according to claim 7, wherein at least a part of the detection member is positioned outside a bracket that connects the seat bottom to the seatback.

13. A vehicle seat comprising:
a seatback;
a seat bottom pivotably attached to the seatback and displaceable to a first position facing a vehicle floor and a second position separate from the first position in a vertical direction and in which a front end and a rear end of the seat bottom are displaced in a vertical direction relative to the first position; and
a lock mechanism for locking the seat bottom to the seatback;
wherein:
the seat bottom is switchable to be under a lock state under which the seat bottom is locked to the seatback and an unlock state under which the seat bottom is unlocked from the seatback;
the vehicle seat further comprises a detection member that is displaceable by abutting on the floor panel while the seat bottom is displaced from the first position to the second position; and
the lock mechanism is configured to make inoperable a function for locking the seat bottom when the detection member is displaced.

14. The vehicle seat according to claim 13, wherein the abutment surface is formed on a connection panel for connecting a lower-level floor portion storing the vehicle seat with the floor panel.

15. The vehicle seat according to claim 14, wherein the abutment surface is an inclined surface.

16. The vehicle seat according to claim 13, wherein the detection member has a plate shape.

17. The vehicle seat according to claim 13, wherein the detection member is formed of a plate member and pivotably supported by a bracket that connects the seat bottom to the seatback.

18. The vehicle seat according to claim 13, wherein at least a part of the detection member is positioned outside a bracket that connects the seat bottom to the seatback.

19. A vehicle seat comprising:
a seatback;
a seat bottom pivotably attached to the seatback and displaceable to a first position facing a vehicle floor and a second position separate from the first position in a front-to rear direction of the vehicle seat and parallel to the first position; and
a lock mechanism for locking the seat bottom to the seatback;
wherein:
the seat bottom is switchable to be under a lock state under which the seat bottom is locked to the seatback and an unlock state under which the seat bottom is unlocked from the seatback;
the vehicle seat further comprises a detection member that is displaceable by abutting on the floor panel while the seat bottom is displaced from the first position to the second position; and
the lock mechanism is configured to make inoperable a function for locking the seat bottom when the detection member is displaced.

20. The vehicle seat according to claim 19, wherein the abutment surface is formed on a connection panel for connecting a lower-level floor portion storing the vehicle seat with the floor panel.

21. The vehicle seat according to claim 20, wherein the abutment surface is an inclined surface.

22. The vehicle seat according to claim 19, wherein the detection member has a plate shape.

23. The vehicle seat according to claim 19, wherein the detection member is formed of a plate member and pivotably supported by a bracket that connects the seat bottom to the seatback.

24. The vehicle seat according to claim 19, wherein at least a part of the detection member is positioned outside a bracket that connects the seat bottom to the seatback.

25. A vehicle seat comprising:
a seatback;

a seat bottom pivotably attached to the seatback and displaceable to a first position facing a vehicle floor and a second position separate from the first position;

a lock mechanism for locking the seat bottom to the seatback; and a bracket that connects the seat bottom to the seatback;

wherein:

the seat bottom is switchable to be under a lock state under which the seat bottom is locked to the seatback and an unlock state under which the seat bottom is unlocked from the seatback;

the vehicle seat further comprises a detection member that is displaceable by abutting on the floor panel while the seat bottom is displaced from the first position to the second position;

the lock mechanism is configured to make inoperable a function for locking the seat bottom when the detection member is displaced; and at least a part of the detecting member projects out of the bracket.

26. The vehicle seat according to claim 25, wherein the part of the detection member projects rearward out of the bracket.

27. The vehicle seat according to claim 25, wherein the detection member is disposed at a higher position than a lower end of the seat bottom.

28. The vehicle seat according to claim 25, wherein the detection member is disposed posterior to a rear end of the seatback.

29. The vehicle seat according to claim 25, wherein the detection member projects posterior to a front end of the seatback.

30. The vehicle seat according to claim 25, wherein:

the lock mechanism comprises a first and a second locking portions that are engageable with and disengageable from each other; and the first and the second locking portions are accommodated inside the bracket.

* * * * *